(12) United States Patent
Vanderheyden

(10) Patent No.: US 6,955,322 B1  
(45) Date of Patent: Oct. 18, 2005

(54) UNIFORM DEFLECTING HUB

(75) Inventor: William Joseph Vanderheyden, Loveland, CO (US)

(73) Assignee: Storage Technology Corporation, Louisville, CO (US)

( * ) Notice: Subject to any disclaimer, the term of this patent is extended or adjusted under 35 U.S.C. 154(b) by 54 days.

(21) Appl. No.: 10/626,991

(22) Filed: Jul. 25, 2003

(51) Int. Cl.$^7$ ............................................ B65H 75/14
(52) U.S. Cl. .................. 242/608.8; 242/610.6; 242/611; 242/613.4
(58) Field of Search .............. 242/608.8, 606, 242/610.6, 613.4, 118.6, 118.7, 611, 611.2

(56) References Cited

U.S. PATENT DOCUMENTS

| | | | |
|---|---|---|---|
| 2,521,922 A | 9/1950 | Kurtz | |
| 2,601,660 A | 6/1952 | Jarmicki | |
| 3,753,533 A | 8/1973 | Lyman | |
| 4,254,919 A | 3/1981 | Moodie | |
| 4,262,856 A * | 4/1981 | Nakagawa | 242/613.4 |
| 4,796,823 A * | 1/1989 | Akao et al. | 242/610.6 |
| 5,400,981 A * | 3/1995 | Rambosek et al. | 242/608.8 |
| 5,829,712 A * | 11/1998 | Morita | 242/610.6 |
| 5,967,455 A | 10/1999 | Farber | |
| 6,003,807 A | 12/1999 | Ripplinger | |
| 6,102,327 A | 8/2000 | Ripplinger | |
| 6,315,230 B1 * | 11/2001 | Hansen et al. | 242/118.6 |
| 6,533,204 B2 | 3/2003 | Ishihara et al. | |
| 6,563,670 B2 | 5/2003 | Brong et al. | |

* cited by examiner

Primary Examiner—John M. Jillions  
(74) Attorney, Agent, or Firm—Brooks Kushman P.C.

(57) ABSTRACT

For use in a media tape cartridge reel, a hub and flange assembly including a hub and a flange. The hub having a first lip and a second lip at opposite ends of the hub. The flange is integral with the hub at the first lip, the hub includes an inner coupling having a hole at the center, and the inner coupling is offset towards the first lip where integrated with the hub.

15 Claims, 2 Drawing Sheets

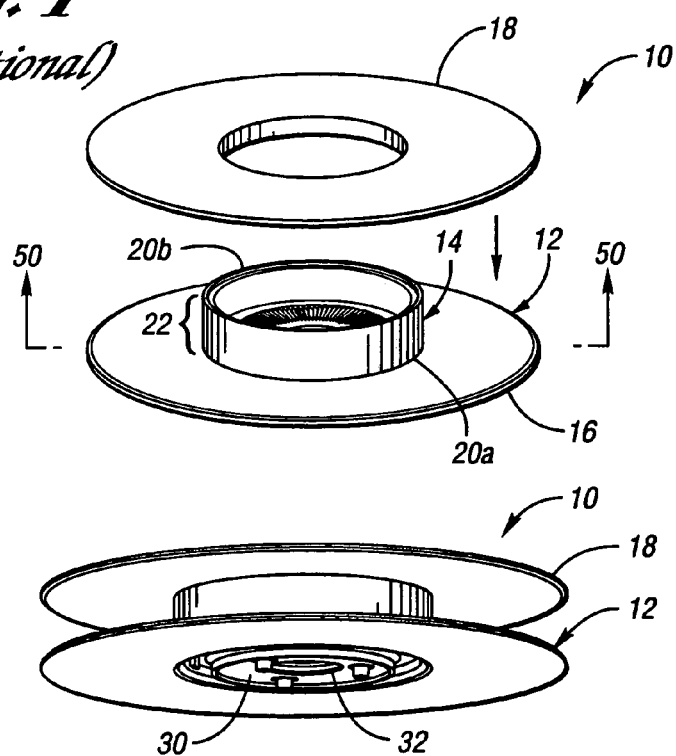
Fig. 1 (Conventional)
Fig. 2 (Conventional)
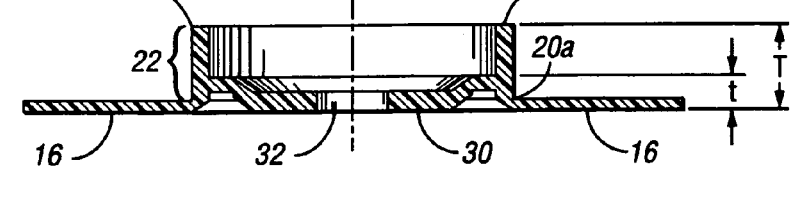
Fig. 3 (Conventional)
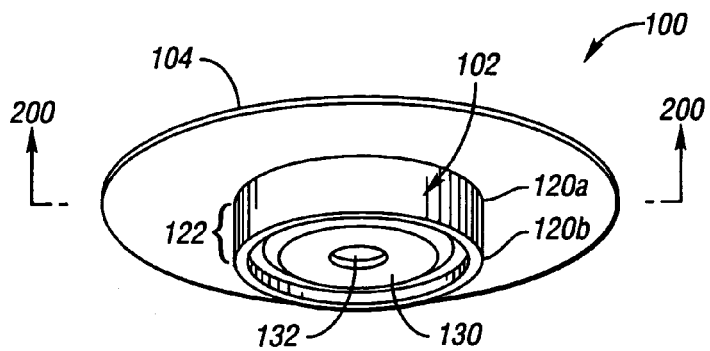
Fig. 4

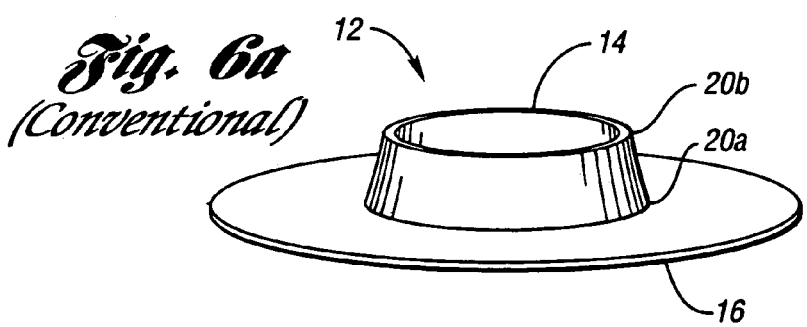
Fig. 6a (Conventional)

US 6,955,322 B1

UNIFORM DEFLECTING HUB

BACKGROUND OF THE INVENTION

1. Field of the Invention

The present invention relates to a system and a method for a uniform deflecting hub.

2. Background Art

Referring to FIG. 1, a diagram illustrating an exploded, perspective view of a conventional magnetic media (e.g., tape) reel (or spool) 10 is shown from an upper vantage point. The reel 10 includes a hub/flange 12 having a hub 14 integral with a lower flange 16, and an upper flange 18 that is joined (e.g., attached, bonded, etc.) to the hub 14. The hub 14 has a lip 20a at an interface to the lower flange 16, and a lip 20b at the attachment to the upper flange 18. The hub 14 has a spooling cylinder 22 between the lips 20a and 20b and magnetic media (not shown) is wound on the reel 10 between inner surfaces of the flanges 16 and 18.

Referring to FIG. 2, a diagram illustrating a perspective view of the conventional reel 10 as assembled is shown from a lower vantage point. The reel 10 is generally formed from a plastic. The upper flange 18, is generally attached to the hub 14 by ultrasonic welding, however, any appropriate bonding such as spin welding, hot plate welding, induction welding, adhesion, etc. may be implemented. The hub 14 has a hat-shaped inner coupling 30 that interfaces with a media drive (not shown) when the reel 10 is mounted to (or in) the media drive. The inner coupling 30 has a hole 32 at the center that engages a shaft (or spindle) in the media drive.

Referring to FIG. 3, a diagram illustrating a sectional view of the hub/lower flange 12, taken at lines 50—50 of FIG. 1, is shown. The hub/flange 12 has a thickness, T. The inner coupling 30 has an outer surface that is essentially flush with an outer surface of the lower flange 16 near the hole 32, and the inner coupling 30 is offset upward (i.e., towards the upper lip 20b) by an offset amount, t, where the inner coupling 30 is integrated with the spooling cylinder 22.

The hub 14 of the media reel 10 is subjected to pressure from the magnetic media as the media is wound onto the spooling cylinder 22. The pressure from the magnetic media increases as the number of wraps of magnetic media increases. The pressure on the hub 14 is a function of hub stiffness. Therefore, a slightly compliant hub is desirable to reduce the pressure on the magnetic media.

The conventional cartridge hub 14, as shown in FIGS. 1–3, varies greatly in stiffness from top to bottom of the winding surface of the cylinder 22 (i.e., between lip 20a and lip 20b). The integral lower flange 16 and inner coupling 30 both add radial stiffness to the bottom of the hub 14. The upper flange 18 (which is joined to the hub/flange 12) does not significantly stiffen the top (i.e., the lip 20b region) of the hub 14. Therefore, under winding pressure (as described below in connection with FIG. 6a), the radial deflection at the top of the hub 14 (i.e., the lip 20b region) is greater than the bottom (i.e., the lip 20a region) resulting in a taper (i.e., the hub 14 has a smaller diameter at the top than at the bottom). The taper of the hub 14 can cause a tension gradient across the width of magnetic media. The taper can adversely affect head-to-media spacing and read-write error margins during media drive operations.

Future media drives are expected to use longer, thinner media (i.e., magnetic media) resulting in greater pressure on the media reel hub. Thus, there exists a need and an opportunity for a system and a method to improve hub performance for media reels. Specifically, a media reel having a uniform deflecting hub would be desirable for use with magnetic media.

SUMMARY OF THE INVENTION

The present invention generally provides an improved method and an improved system for a media reel hub. The present invention may provide a hub for use in a magnetic media reel that deflects uniformly. Such a hub may result in more uniform head-to-media spacing, and reduction of read-write error margins during media drive operations.

According to the present invention, for use in a media tape cartridge reel, a hub and flange assembly is provided. The hub and flange assembly comprising a hub having a first lip and a second lip at opposite ends of the hub, and a flange, wherein the flange is integral with the hub at the first lip, the hub comprises an inner coupling having a hole at the center, and the inner coupling is offset towards the first lip where integrated with the hub.

Also according to the present invention, for use in a reel, a hub/flange is provided. The hub/flange comprising a hub having a first lip and a second lip at opposite ends of the hub, and a flange, wherein the flange is integral with the hub at the first lip, and the hub comprising an inner coupling having a hole at the center and the inner coupling is offset towards the first lip where integrated with the hub.

Further, according to the present invention, a method of producing a hub/flange for use in a media tape cartridge reel is provided. The method comprising providing a hub having a first lip and a second lip at opposite ends of the hub, and integrally forming a flange with the hub at the first lip, wherein the hub comprises an inner coupling having a hole at the center and the inner coupling is offset towards the first lip where integrated with the hub.

The above features, and other features and advantages of the present invention are readily apparent from the following detailed descriptions thereof when taken in connection with the accompanying drawings.

BRIEF DESCRIPTION OF THE DRAWINGS

FIG. 1 is an exploded, perspective view of a conventional media reel;

FIG. 2 is a perspective view of an assembled conventional media reel;

FIG. 3 is a sectional view of a conventional media reel hub/flange;

FIG. 4 is a perspective view of a media reel hub/flange of the present invention;

DETAILED DESCRIPTION OF THE PREFERRED EMBODIMENT(S)

Figure 5A:
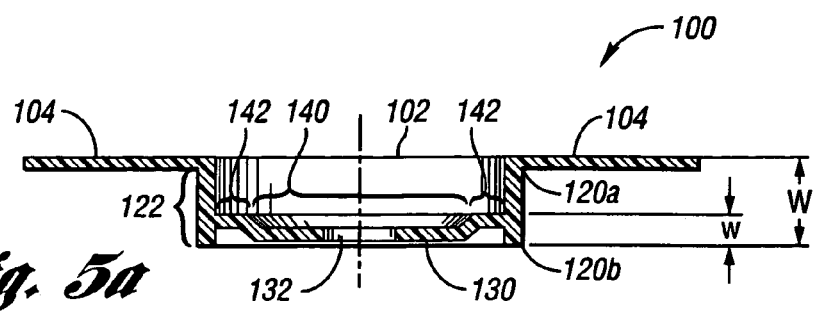
FIGS. 5(a–c) are sectional views of embodiments of a media reel hub/flange of the present invention.

With reference to the Figures, the preferred embodiments of the present invention will now be described in detail. Generally, the present invention provides a system and a method for an improved media reel hub. The present invention may provide a uniform deflecting hub for use in a magnetic media reel. Such a uniformly deflecting hub may result in more uniform head-to-media spacing and reduction of read-write error margins during media drive operations.

Referring to FIG. 4, a diagram illustrating a perspective view of a hub/flange (or hub and flange assembly) 100 of the present invention is shown from a lower vantage point. The hub/flange 100 is generally implemented in connection with a reel or spool (not shown). In one example, the reel that implements the hub/flange 100 may be used to wind (and unwind) media (not shown). The media may be advantageously implemented as magnetic tape. In one example, the reel that implements the hub/flange 100 may be implemented in connection with a tape cartridge. However, the hub/flange 100 may be implemented in connection with any appropriate reel or spool to meet the design criteria of a particular application.

The hub/flange (or hub and flange assembly) 100 generally comprises a hub 102 integral with an upper flange 104. The hub 102 may have a lip 120a (e.g., a first lip) at an interface to the upper flange 104, and a lip 120b (e.g., a second lip). The hub 102 generally comprises a spooling cylinder (e.g., tube, barrel, etc.) 122 between the lips 120a and 120b (i.e., the lips 120a and 120b are generally located at opposite ends of the cylinder 122). A lower flange (not shown) is generally joined (e.g., attached, bonded, etc.) to the hub 102 at the lip 120b to provide a reel or spool. Media (e.g., magnetic tape) or any other appropriate flexible, spoolable item (not shown) is generally wound on the spooling cylinder 122 between inner surfaces of the flange 104 and the lower flange.

The hub/flange 100 is generally formed from a plastic. The lower flange is generally attached to the hub 102 at the lip 120b by ultrasonic welding, however, any appropriate bonding such as spin welding, hot plate welding, induction welding, adhesion, etc. may be implemented. The hub 102 generally has an inner coupling 130 that interfaces with a media drive (not shown) when the reel formed from the hub/flange 100 and the lower flange is mounted to (or in) the media drive. The inner coupling 130 has a hole 132 at the center that engages a shaft (or spindle) in the media drive.

Referring to FIGS. 5(a–c), diagrams illustrating a sectional view of embodiments of the hub/flange 100, taken at lines 200—200 of FIG. 4, are shown. The hub/flange 100 has a thickness (or width), W, between the lips 120a and 120b. The inner coupling 130 is offset upward (i.e., towards the upper lip 120a) from the lip 120b by an offset amount, w, where the inner coupling 130 is integrated with (or into) the spooling cylinder 122. In the example shown in FIG. 5a, the inner coupling 130 is generally hat-shaped having a body (or crown) region 140 of the hat-shape in the vicinity of the hole 132 and a brim 142 of the hat extends from the hat body 140 to an inner surface of the barrel 122. The inner coupling 130 has an outer (i.e., lower) surface that may be about, essentially or substantially flush with the lip 120b near (i.e., surrounding) the hole 132 (i.e., the crown region 140 may be disposed in a direction opposite the lip 120a and nearly flush with the lip 120b) while the brim 142 is generally offset from the lip 120b by the offset amount w. The relative diameters of the crown region 140 and the brim 142 may be any appropriate ratio to meet the design criteria of a particular application.

The offset amount w generally is an amount in a range of 10% to 50% of the thickness W. In one example, the offset amount w is in a range of 15% to 40% of the thickness W. In a preferred embodiment, the offset amount w is in a range of 20% to 30% of the thickness W. In a most preferred embodiment, the offset amount w is about (i.e., approximately, nearly, substantially, essentially, etc.) 25% (or ¼) of the thickness W. However, the offset amount w may be any appropriate amount, ratio or percentage to meet the design criteria of a particular application.

Figure 5B:
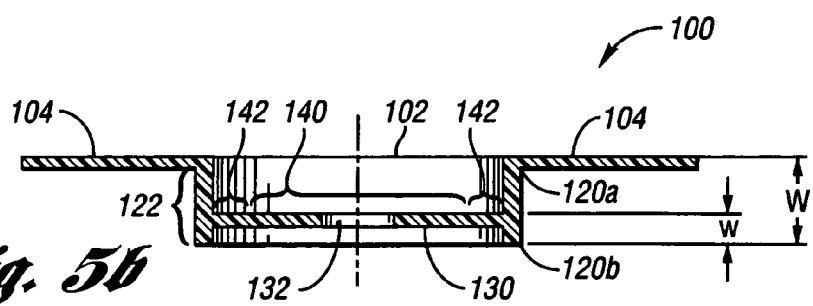
Figure 5C:
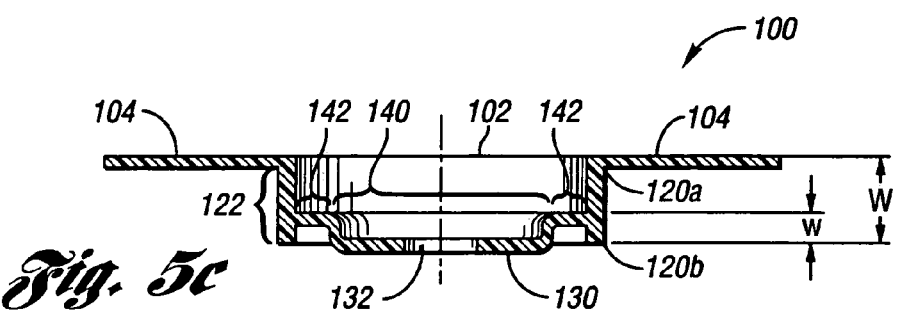

In the example embodiment of the hub/flange 100 illustrated in FIG. 5b, the inner coupling 130 may be substantially flat (i.e., the crown 140 and the brim 142 may be about or essentially flush to each other and the brim 142 is generally offset from the lip 120b by the offset amount w). In the example embodiment of the hub/flange (or hub and flange assembly) 100 illustrated in FIG. 5c, the inner coupling 130 may be hat-shaped and the crown region 140 may be disposed in a direction opposite the lip 120a and past (or beyond) the lip 120b while the brim 142 is generally offset from the lip 120b towards the lip 120a by the offset amount w.

Figure 6B:
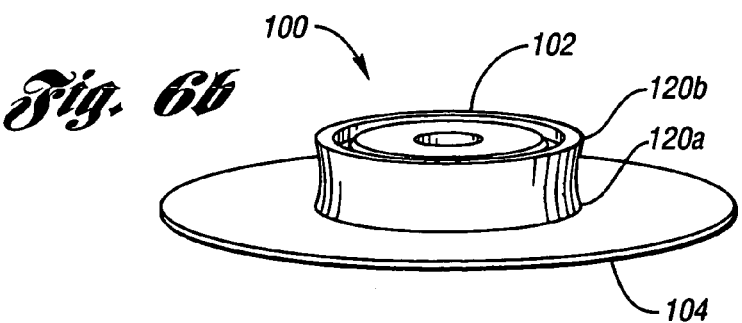
FIGS. 6(a–b) are perspective views of a simulation of a conventional media reel hub/flange and of a media reel hub/flange of the present invention, respectively.

Referring to FIGS. 6a and 6b, diagrams illustrating finite element structural analysis simulations are shown. The simulations compare radial deflection of a conventional hub such as the hub/flange 12 of the reel 10 to the improved hub/flange 100 of the present invention, respectively, during loading as generated by media winding.

The improved hub/flange (or hub and flange assembly) 100 of the present invention solves the problem of non-uniform (i.e., tapered) deflection during loading as exhibited by the conventional hub/flange 12, by providing uniform radial stiffness to both the top (i.e., the cylinder 122 near the lip 120a) and bottom (i.e., the cylinder 122 near the lip 120b) of the hub 102. The present invention provides the integral flange 104 that is generally connected to the top of the hub 102, providing radial stiffness to the upper (i.e., the lip 120a) end of the hub 102. The inner coupling 130 surface that is generally integrated with the cylinder 122 is positioned near the bottom (i.e., towards the lip 120b) of the hub 102, providing radial stiffness at the bottom (i.e., the lip 120b) end of the hub 102. Since the inner coupling 130 surface generally provides slightly greater radial stiffness than the flange 104, the inner coupling 130 surface is generally positioned to be integrated with the cylinder 122 approximately ¼ of the way up the hub 102 (i.e., the offset amount w is generally about or approximately 25% of the hub 102 thickness W). The result is substantially equal deflection at the top and bottom of the hub 102 (and, thus, substantially equal radial deflection in the reel that is implement in connection with the hub/flange 100) under media pack winding pressure.

As is readily apparent from the foregoing description, then, the present invention generally provides an improved system and an improved method for a media reel hub (or hub/flange). The uniform deflecting hub of the present invention provides a significant improvement when compared to the conventional single reel media cartridges. The improved hub/flange 100 of the present invention may be advantageously implemented in connection with longer, thinner media that generally produces higher pressure on the media reel hub than thicker media as has been implemented in previous media. A uniform deflecting hub such as the hub 102 of the hub/flange 100 of the present invention may provide more uniform head-to-media spacing and reduction of read-write error margins during media drive operations regardless of the thickness of the media when compared to the conventional hub or hub/flange approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in a media tape cartridge reel, a hub and flange assembly comprising:
    a hub having a first lip and a second lip at opposite ends of the hub; and
    a flange, wherein the flange is integral with the hub at the first lip, the hub comprises an inner coupling having a hole at the center, the inner coupling is offset towards the first lip where integrated with the hub, and the inner coupling is hat-shaped having a crown region near the hole and the crown region is disposed in a direction opposite the first lip and past the second lip.

2. The hub and flange assembly of claim 1 further comprising a second flange wherein the second flange is joined to the hub/flange at the second lip.

3. The hub and flange assembly of claim 1 wherein the hub has a thickness between the first and second lips, and the inner coupling offset is in a range of 10% to 50% of the thickness of the hub.

4. The hub and flange assembly of claim 1 wherein the hub has a thickness between the first and second lips, and the inner coupling offset is in a range of 20% to 30% of the thickness of the hub.

5. The hub and flange assembly of claim 1 wherein the hub has a thickness between the first and second lips, and the inner coupling offset is about 25% of the thickness of the hub.

6. For use in a reel, a hub/flange comprising:
    a hub having a first lip and a second lip at opposite ends of the hub; and
    a flange, wherein the flange is integral with the hub at the first lip, the hub comprising an inner coupling having a hole at the center and the inner coupling is offset towards the first lip where integrated with the hub, and the inner coupling is hat-shaped having a crown region near the hole and the crown region is disposed in a direction opposite the first lip and past the second lip.

7. The hub/flange of claim 6 further comprising a second flange wherein the second flange is joined to the hub/flange at the second lip.

8. The hub/flange of claim 6 wherein the hub has a thickness between the first and second lips, and the inner coupling offset is in a range of 10% to 50% of the thickness of the hub.

9. The hub/flange of claim 6 wherein the hub has a thickness between the first and second lips, and the inner coupling offset is in a range of 20% to 30% of the thickness of the hub.

10. The hub/flange of claim 6 wherein the hub has a thickness between the first and second lips, and the inner coupling offset is about 25% of the thickness of the hub.

11. A method of producing a hub/flange for use in a media tape cartridge reel, the method comprising:
    providing a hub having a first lip and a second lip at opposite ends of the hub; and
    integrally forming a flange with the hub at the first lip, wherein the hub comprises an inner coupling having a hole at the center and the inner coupling is offset towards the first lip where integrated with the hub, and the inner coupling is hat-shaped having a crown region near the hole and the crown region is disposed in a direction opposite the first lip and past the second lip.

12. The method of claim 11 further comprising providing a second flange wherein the second flange is joined to the hub/flange at the second lip.

13. The method of claim 11 wherein the hub has a thickness between the first and second lips, and the inner coupling offset is in a range of 10% to 50% of the thickness of the hub.

14. The method of claim 11 wherein the hub has a thickness between the first and second lips, and the inner coupling offset is in a range of 20% to 30% of the thickness of the hub.

15. The method of claim 11 wherein the hub has a thickness between the first and second lips, and the inner coupling offset is about 25% of the thickness of the hub.

* * * * *